(12) United States Patent
Kim et al.

(10) Patent No.: US 10,138,957 B2
(45) Date of Patent: Nov. 27, 2018

(54) CLUTCH CONTROL METHOD FOR VEHICLE

(71) Applicants: HYUNDAI MOTOR COMPANY, Seoul (KR); KIA MOTORS CORPORATION, Seoul (KR); IUCF-HYU (Industry-University Cooperation Foundation Hanyang University), Seoul (KR)

(72) Inventors: Jin Sung Kim, Hwaseong-si (KR); Ho Young Lee, Bucheon-si (KR); Jahng Hyon Park, Seoul (KR); Young Ho Ko, Suwon-si (KR)

(73) Assignees: HYUNDAI MOTOR COMPANY, Seoul (KR); KIA MOTORS CORPORATION, Seoul (KR); IUCF-HYU (INDUSTRY-UNIVERSITY COOPERATION FOUNDATION HANYANG), Seoul (KR)

( * ) Notice: Subject to any disclaimer, the term of this patent is extended or adjusted under 35 U.S.C. 154(b) by 17 days.

(21) Appl. No.: 15/644,096

(22) Filed: Jul. 7, 2017

(65) Prior Publication Data

US 2018/0172091 A1    Jun. 21, 2018

(30) Foreign Application Priority Data

Dec. 15, 2016   (KR) .................. 10-2016-0171221

(51) Int. Cl.
*F16D 48/06*    (2006.01)

(52) U.S. Cl.
CPC ........ *F16D 48/06* (2013.01); *F16D 2500/102* (2013.01); *F16D 2500/10412* (2013.01);
(Continued)

(58) Field of Classification Search
CPC .............. F16D 48/06; F16D 2500/102; F16D 2500/50236; F16D 2500/525; F16D 2500/70264; F16D 2500/7082
See application file for complete search history.

(56) References Cited

U.S. PATENT DOCUMENTS

| 5,679,091 A | * | 10/1997 | Salecker | ........... B60K 28/165 477/86 |
| 2013/0275017 A1 | * | 10/2013 | Gauthier | ............. F16D 25/0638 701/68 |
| 2014/0324308 A1 | * | 10/2014 | Pietron | ................... F16D 48/06 701/68 |

FOREIGN PATENT DOCUMENTS

| DE | 60 2004 005 267 T2 | 12/2007 |
| DE | 10 2011 080 716 A1 | 4/2012 |

(Continued)

OTHER PUBLICATIONS

Föllinger, Otto, Regelungstechnik, Chapter 12, pp. 322-356 (1980), with English abstract.

(Continued)

*Primary Examiner* — Edwin A Young
(74) *Attorney, Agent, or Firm* — Brinks Gilson & Lione

(57) ABSTRACT

A clutch control method for a vehicle includes steps of: calculating, by a controller, an estimated clutch torque by substituting a plurality of parameters, and a sensed stroke of a clutch actuator into a predetermined characteristic function; updating, by the controller, the parameters as new values by a prediction error method using a torque error, which is a difference between a reference clutch torque and the estimated clutch torque; calculating a desired stroke by substituting a desired clutch torque and the updated parameters into a predetermined characteristic inverse function; and driving the clutch actuator based on the calculated desired stroke to control the clutch by the controller. The (Continued)

plurality parameters represent physical properties of a clutch, and the predetermined characteristic function represents characteristics of a clutch transmission torque to a clutch actuator stroke. In addition, the predetermined characteristic inverse function represents a clutch actuator stroke to a clutch transmission torque.

7 Claims, 5 Drawing Sheets

(52) U.S. Cl.
CPC ............ *F16D 2500/3023* (2013.01); *F16D 2500/3024* (2013.01); *F16D 2500/3026* (2013.01); *F16D 2500/30401* (2013.01); *F16D 2500/30412* (2013.01); *F16D 2500/30421* (2013.01); *F16D 2500/30425* (2013.01); *F16D 2500/50236* (2013.01); *F16D 2500/525* (2013.01); *F16D 2500/7041* (2013.01); *F16D 2500/7082* (2013.01); *F16D 2500/70264* (2013.01); *F16D 2500/70426* (2013.01)

(56) References Cited

FOREIGN PATENT DOCUMENTS

| | | |
|---|---|---|
| DE | 10 2011 107 232 A1 | 1/2013 |
| EP | 2 136 194 A1 | 12/2009 |
| KR | 10-2014-0055190 | 5/2014 |

OTHER PUBLICATIONS

European Extended Search Report dated Mar. 27, 2018 from the corresponding European Patent Application No. 17 181 159.9.

\* cited by examiner

CLUTCH CONTROL METHOD FOR VEHICLE

CROSS REFERENCE TO RELATED APPLICATION

This application claims the priority to and the benefit of Korean Patent Application No. 10-2016-0171221, filed on Dec. 15, 2016, which is incorporated herein by reference in its entirety.

FIELD

The present disclosure relates to a clutch control method for a vehicle.

BACKGROUND

The statements in this section merely provide background information related to the present disclosure and may not constitute prior art.

An AMT (Automated Manual Transmission) or a DCT (Dual Clutch Transmission) uses a dry clutch that allows power to be transmitted from a power source such as an engine to the transmission.

Since the dry clutch does not use a separate hydraulic device, it is advantageous in terms of a small number of parts and relative low cost. However, it takes a lot of effort to accurately control the dry clutch since the characteristics of the dry clutch vary relatively widely depending on the temperature or the like.

In the AMT or DCT, the dry clutch (hereinafter, simply referred to as the "clutch") is controlled in the following manner. Once a stroke is formed by a clutch actuator, the transmission torque of the clutch is changed depending on the size of the stroke while the clutch is operated. Accordingly, a controller controls the clutch actuator to determine what to form the stroke of the clutch actuator to a degree so as to form a desired size of clutch transmission torque, thereby controlling the clutch. For the control of the clutch, there is provided a T-S (Torque-Stroke) curve that represents characteristics of a clutch transmission torque to a clutch actuator stroke.

However, since the characteristics of the transmission torque to the stroke vary widely depending on the temperature of the clutch or the other driving condition, it is trying to properly adapt the T-S curve according to the varying clutch characteristics.

The foregoing is intended merely to aid in the understanding of the background of the present disclosure, and is not intended to mean that the present disclosure falls within the purview of the related art that is already known to those skilled in the art.

SUMMARY

The present disclosure proposes a clutch control method for a vehicle, capable of more accurately estimating characteristics of a clutch transmission torque to a clutch actuator stroke in real time in order to enhance shift quality with an improvement in accuracy of clutch control and enhance merchantable quality of a vehicle.

In one aspect of the present disclosure, a clutch control method for a vehicle includes steps of: calculating an estimated clutch torque by substituting a plurality of parameters, which represent physical properties of a clutch, and a sensed stroke of a clutch actuator into a predetermined characteristic function, which represents characteristics of a clutch transmission torque to a clutch actuator stroke, by a controller; updating the plurality of parameters as new values by a prediction error method based on a torque error, which is a difference between a reference clutch torque referring to a current transmission torque of the clutch and the estimated clutch torque calculated in the step of calculating the estimated clutch torque, by the controller; calculating a desired stroke by substituting a desired clutch torque and the updated parameters into a predetermined characteristic inverse function, which represents a clutch actuator stroke to a clutch transmission torque, by the controller, and driving the clutch actuator based on the calculated desired stroke to control the clutch by the controller.

The plurality of parameters may include a touch point, a cushion spring constant, a diaphragm spring constant, a clutch actuator stroke at which a diaphragm spring begins to be deformed, and a rate of change of a value, which is obtained by adding the cushion spring constant and the diaphragm spring constant, based on a change of the clutch actuator stroke.

The characteristic function may be calculated as:

$$\hat{T}_{cl}(\breve{u}) = 1/2\{\tan h(10(\breve{u}-p_0)) + |\tan h(10(\breve{u}-p_0))|\}p_1(\breve{u}-p_0) + 1/2\{\tan h(p_4(\breve{u}-p_0-p_3)) + |\tan h(p_4(\breve{u}-p_0-p_3))|\}p_2(\breve{u}-p_0-p_3),$$

where:

$\hat{T}_{cl}$: an estimated clutch torque,
$\breve{u}_{cl}$: a sensed clutch actuator stroke,
$p_0$: a clutch touch point,
$p_1$: a cushion spring constant,
$p_2$: a diaphragm spring constant,
$p_3$: a clutch actuator stroke at which a diaphragm spring begins to be deformed, and
$p_4$: a rate of change of a value, which is obtained by adding the cushion spring constant and the diaphragm spring constant, based on a change of the clutch actuator stroke.

The characteristic inverse function may be calculated as:

$$\breve{u}(\tilde{T}_{cl}) = p_0 + \frac{1}{p_1}\tilde{T}_{cl} - \frac{p_2\frac{\alpha*(\tilde{T}_{cl}-p_1p_3)+\beta}{(\tilde{T}_{cl}-p_1p_3)+\gamma}}{p_1\left(p_1+p_2\frac{\alpha*(\tilde{T}_{cl}-p_1p_3)+\beta}{(\tilde{T}_{cl}-p_1p_3)+\gamma}\right)}(\tilde{T}_{cl}-p_1p_3),$$

where:
$\breve{u}$: a desired stroke,
$\tilde{T}_{cl}$: a desired clutch torque, $$\alpha(p_1, p_2) = \frac{1.446\frac{p_1}{p_2}+1.494}{\frac{p_1}{p_2}+1.304},$$

$$\beta(p_1, p_2, p_4) = \left(\frac{103.7\frac{p_2}{p_1}-154.8}{\frac{p_2}{p_1}+2765}\right)\left(\frac{p_1}{p_4}\right), \text{ and}$$

$$\gamma(p_1, p_2, p_4) = \left(\frac{2103\frac{p_2}{p_1}-4146}{\frac{p_2}{p_1}+5003}\right)\left(\frac{p_1}{p_4}\right).$$

The updating the parameters may be performed using the following equation:

$$p_n(k) = p_n(k-1) + q(k)e(k),$$

where:
n: 1, 2, 3, and 4,
k: a current control cycle, k−1: a previous control cycle, $e(k) = \bar{T}_{cl}(k) - \hat{T}_{cl}(k)$, $T_{cl}(k)$: a reference clutch torque, $q(k) = p_n(k-1)\psi(k)/s(k)$, $s(k) = \psi^T(k)p_n(k-1)\psi(k) - \lambda(k)$, $\lambda(k)$: a forgetting factor ($0 < \lambda(k) \leq 1$), and $$\psi = \begin{bmatrix} \frac{\partial T_{cl}}{\partial p_1} \\ \frac{\partial T_{cl}}{\partial p_2} \\ \frac{\partial T_{cl}}{\partial p_3} \\ \frac{\partial T_{cl}}{\partial p_4} \end{bmatrix} = \begin{bmatrix} \frac{1}{2}\{\tanh(10(u-p_0)) + |\tanh(10(u-p_0))|\}(u-p_0) \\ \frac{1}{2}\{\tanh(p_4(u-p_0-p_3)) + |\tanh(p_4(u-p_0-p_3))|\}(u-p_0-p_3) \\ -p_2\tanh(p_4(u-p_0-p_3)) - \\ \frac{p_4}{\cosh^2(p_4(u-p_0-p_3))}p_2(u-p_0-p_3) \\ \frac{(u-p_0-p_3)}{\cosh^2(p_4(u-p_0-p_3))}p_2(u-p_0-p_3) \end{bmatrix},$$

where: $T_{cl} = \bar{T}_{cl}$ and $u = \breve{u}$.

The reference clutch torque may be a torque value of a torque observer.

In a state in which micro-slip of the clutch is maintained under approximately 50 RPM, a torque of an engine connected to the clutch may be used as the reference clutch torque.

As apparent from the above description, the clutch control method for a vehicle in the exemplary forms of the present disclosure can more accurately estimate the characteristics of the clutch transmission torque to the clutch actuator stroke in real time in order to enhance shift quality with an improvement in accuracy of clutch control and enhance merchantable quality of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
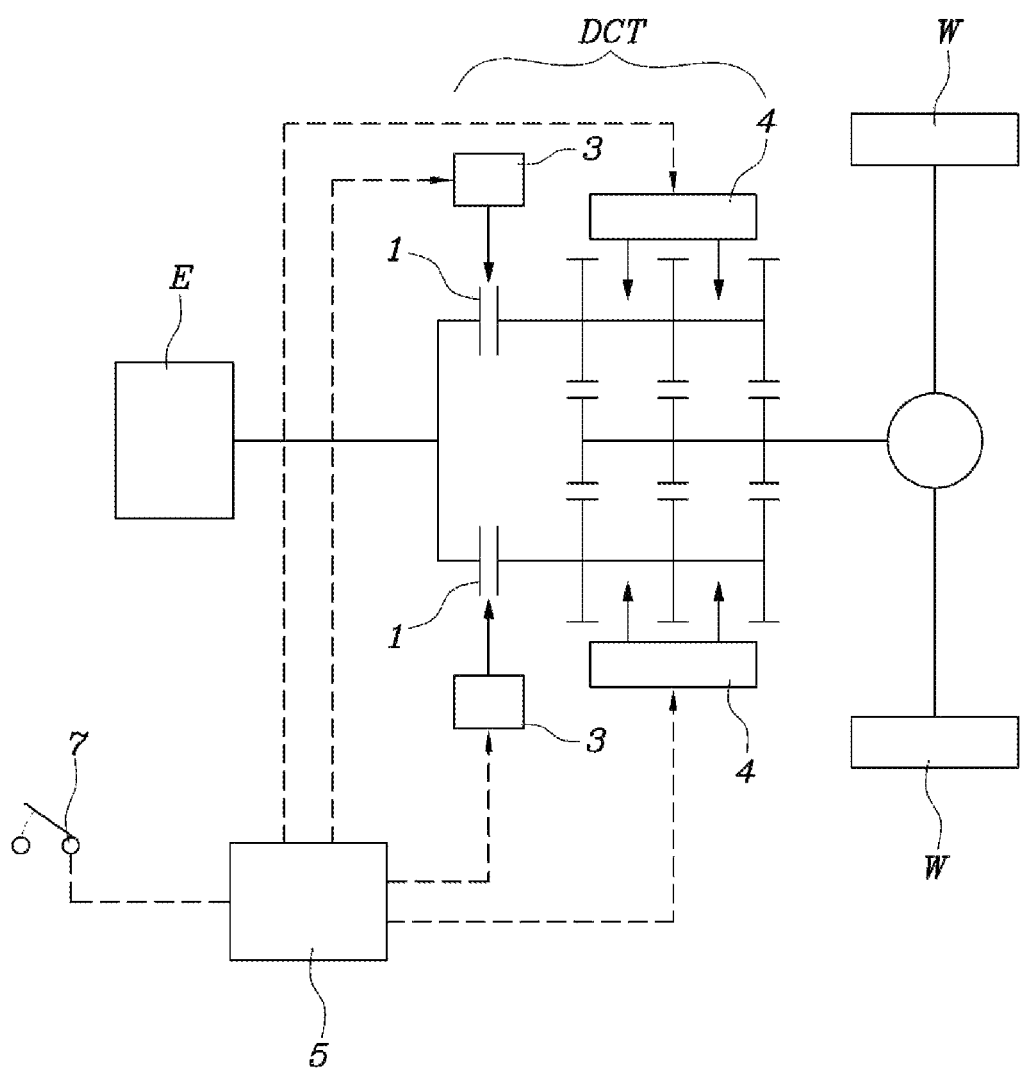
FIG. 1 is a diagram illustrating a configuration of a vehicle having a DCT to which the present disclosure pertains.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a configuration of a vehicle having a DCT (Dual Clutch Transmission) to which the present disclosure pertains, and the vehicle is configured to supply power from an engine E to drive wheels W through the DCT. Two constituent clutches 1 of the DCT are controlled by clutch actuators 3, respectively, and shift gears forming respective shift stages are shifted by shift actuators 4 that are driven by selecting synchronizers. The clutch actuators 3 and the shift actuators 4 are controlled by a controller 5, and the controller 5 receives an operation amount of an accelerator pedal in response to signals input from an APS (Accelerator Position Sensor) 7.

Of course, the controller 5 may also receive information of engine torque and engine speed, and may receive operation strokes of the clutch actuators 3 through sensors from the clutch actuators 3.

In addition, the controller may receive information of the torque of the engine as a power source and the torque of a drive motor to utilize the information for control of the clutch actuators 3 and the shift actuators 4 in a hybrid vehicle.

Figure 2:
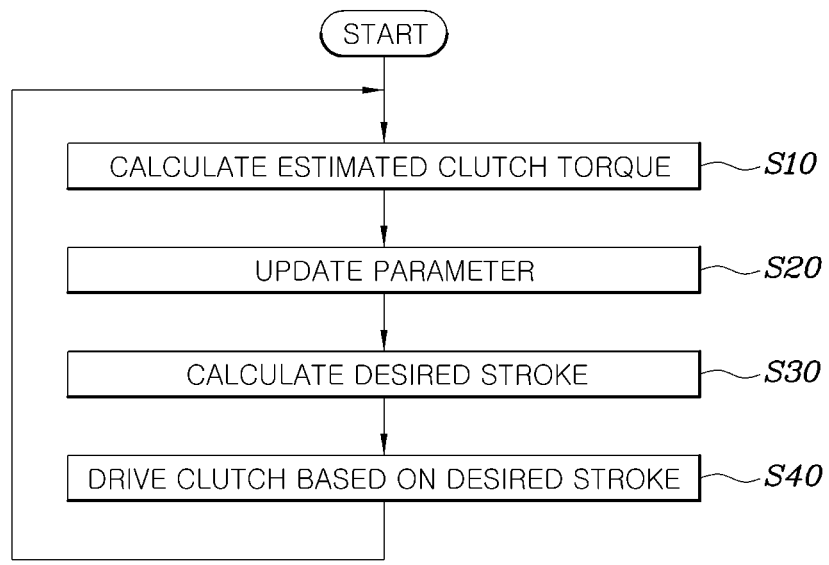
FIG. 2 is a flowchart illustrating a clutch control method for a vehicle in one form of the present disclosure.

As illustrated in FIG. 2, a clutch control method for a vehicle in one form of the present disclosure includes: a torque estimation step (S10) of calculating an estimated clutch torque by substituting a plurality of parameters, which represent physical properties of a clutch 1, and a sensed stroke of a clutch actuator into a predetermined characteristic function, which represents characteristics of a clutch transmission torque to a clutch actuator stroke, by a controller 5; a parameter update step (S20) of updating the parameters as new values by a prediction error method using a torque error, which is a difference between a reference clutch torque referring to a current transmission torque of the clutch 1 and the estimated clutch torque calculated in the torque estimation step, by the controller 5; a stroke calculation step (S30) of calculating a desired stroke by substituting a desired clutch torque and the updated parameters into a predetermined characteristic inverse function, which represents a clutch actuator stroke to a clutch transmission torque, by the controller 5; and a driving step (S40) of driving the clutch actuator 3 based on the calculated desired stroke to control the clutch 1 by the controller 5.

Here, the present disclosure may more accurately control the clutch 1 while following variations in the physical properties of the clutch in real time by substituting the current stroke of the clutch actuator and the parameters into the characteristic function to calculate the estimated clutch torque, by updating the parameters by the prediction error method using the torque error that is obtained by subtracting the estimated clutch torque from the reference clutch torque, by substituting the desired clutch torque required for the clutch and the updated parameters into the characteristic inverse function to calculate the desired stroke, by driving the clutch actuator based on the calculated desired stroke, by reflecting the variation in the physical properties of the clutch varying in real time as variations in the parameters, and by calculating a desired stroke to a new desired clutch torque using the varied parameters.

The parameters, which represent the physical properties of the clutch 1, include a touch point $p_0$, a cushion spring constant $p_1$, a diaphragm spring constant $p_2$, a clutch actuator stroke at which a diaphragm spring begins to be deformed $p_3$, and a rate of change of a value, which is obtained by adding the cushion spring constant and the diaphragm spring constant, depending on the change of the clutch actuator stroke $p_4$.

The touch point $p_0$ is a point of time when the contact of the clutch substantially begins as the stroke of the clutch actuator 3 increases, in which case the transmission torque of the clutch theoretically begins to increase from "0" to a level higher than "0".

Figure 3:
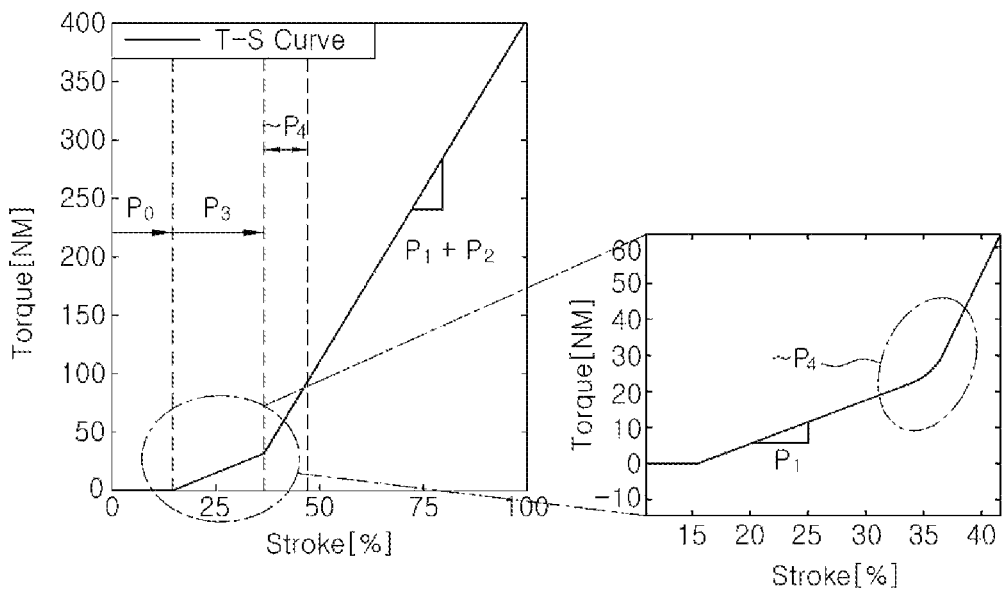
FIG. 3 is a graph for explaining the relationship between a T-S curve and a parameter in one form of the present disclosure.

The cushion spring constant $p_1$ may mean elasticity provided by the friction material itself for the clutch, and refers to a gradient of the clutch transmission torque, which linearly increases immediately after the touch point in FIG. 3.

The diaphragm spring constant $p_2$ means elasticity of the diaphragm spring of the clutch according to the increase in the stroke of the clutch actuator. The parameter $p_3$ is a clutch actuator stroke at which the diaphragm spring begins to be deformed.

Accordingly, as illustrated in FIG. 3, as the stroke of the clutch actuator increases, the clutch transmission torque increases at the gradient of the cushion spring constant $p_1$ before the parameter $p_3$, and then increases at the gradient of the sum of the cushion spring constant pi and the diaphragm spring constant $p_2$.

However, the diaphragm spring constant is not substantially exhibited by 100% at the initial stage of deformation of the diaphragm spring, but is changed from 0% to 100% as the stroke of the clutch actuator increases. Therefore, the present disclosure uses the parameter $p_4$ to reflect such a change.

That is, the parameter $p_4$ is a rate of change of a value, which is obtained by adding the cushion spring constant and the diaphragm spring constant, depending on the change of the clutch actuator stroke. In FIG. 3, the parameter $p_4$ allows the clutch transmission torque to be smoothly rounded and increase in a slight section immediately after the stroke of the clutch actuator passes through $p_3$.

Figure 4:
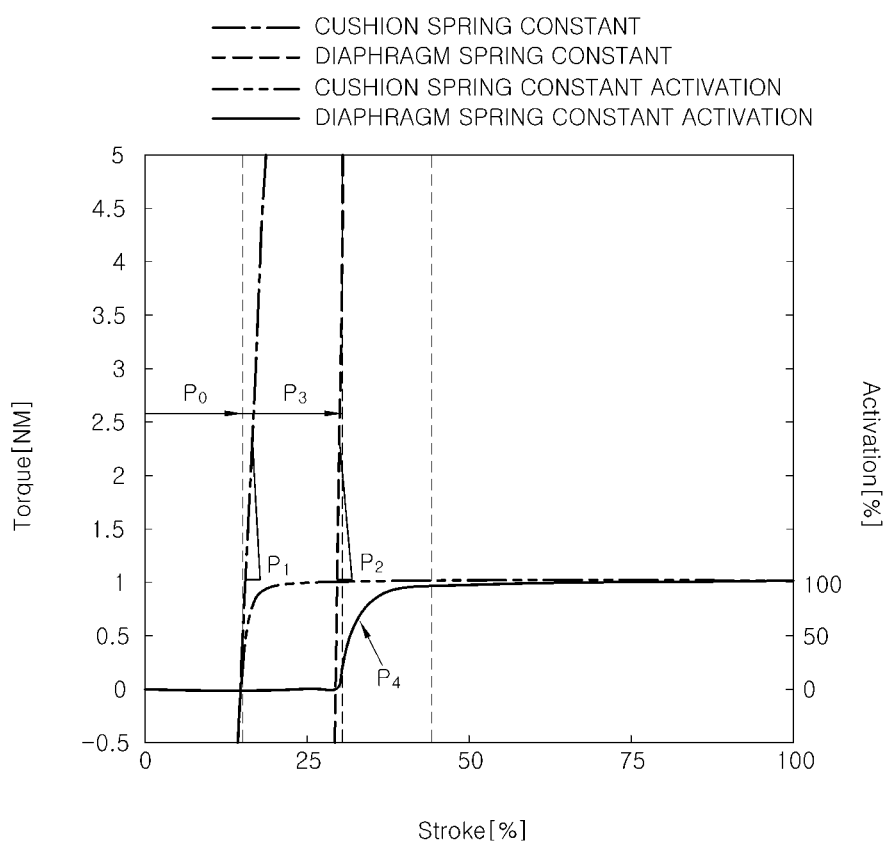
FIG. 4 is a graph for explaining activation of a spring constant to a clutch actuator stroke in one form of the present disclosure.

For reference, FIG. 4 is a graph illustrating that the activation of the diaphragm spring constant is changed from 0% to 100% as the stroke of the clutch actuator increases, and "$\sim p_4$" means that the parameter $p_4$ varies depending on the stroke of the clutch actuator.

The reason the cushion spring constant is added to the parameter $p_4$ according to the change of the clutch actuator stroke is because the cushion spring constant consistently acts, in a state in which it is already activated by 100%, in the working range of the diaphragm spring.

The characteristic function is expressed by the following equation:

$$\hat{T}_{cl}(\check{u})=1/2\{\tan h(10(\check{u}-p_0))+|\tan h(10(\check{u}-p_0))|\}p_1(\check{u}-p_0)+1/2\{\tan h(p_4(\check{u}-p_0-p_3))+|\tan h(p_4(\check{u}-p_0-p_3))|\}p_2(\check{u}-p_0-p_3),$$

where $\hat{T}_{cl}$: an estimated clutch torque,
$\check{u}$: a sensed clutch actuator stroke,
$p_0$: a clutch touch point,
$p_1$: a cushion spring constant,
$p_2$: a diaphragm spring constant,
$p_3$: a clutch actuator stroke at which a diaphragm spring begins to be deformed, and
$p_4$: a rate of change of a value, which is obtained by adding the cushion spring constant and the diaphragm spring constant, depending on the change of the clutch actuator stroke.

The controller first calculates the estimated clutch torque $\hat{T}_{cl}$ using initial values of the parameters in a control cycle. The initial values may be values that are predetermined and input according to the physical properties of the clutch, or may be values that are determined and stored during traveling of a previous vehicle so that the stored values are used as initial values when a new vehicle begins to travel.

In addition, although the sensed clutch actuator stroke $\check{u}$ that is desired to calculate the estimated clutch torque $\hat{T}_{cl}$ may be obtained by a separate sensor, it may be calculated by a value from a hall sensor that senses the motor driving state of the clutch actuator.

The parameter update step is performed using the following equation:

$$p_n(k)=p_n(k-1)+q(k)e(k),$$

where n: 1, 2, 3, and 4,
k: a current control cycle,
k−1: a previous control cycle, $$e(k)=\overline{T}_{cl}(k)-\hat{T}_{cl}(k),$$

$\overline{T}_{cl}(k)$: a reference clutch torque, $$q(k)=p_n(k-1)\psi(k)/s(k),$$

$$s(k)=\psi^T(k)p_n(k-1)\psi(k)-\lambda(k),$$

$\lambda(k)$: a forgetting factor ($0<\lambda(k)<1$), and $$\psi = \begin{bmatrix} \frac{\partial T_{cl}}{\partial p_1} \\ \frac{\partial T_{cl}}{\partial p_2} \\ \frac{\partial T_{cl}}{\partial p_3} \\ \frac{\partial T_{cl}}{\partial p_4} \end{bmatrix} = \begin{bmatrix} \frac{1}{2}\{\tanh(10(u-p_0))+|\tanh(10(u-p_0))|\}(u-p_0) \\ \frac{1}{2}\{\tanh(p_4(u-p_0-p_3))+|\tanh(p_4(u-p_0-p_3))|\}(u-p_0-p_3) \\ -p_2\tanh(p_4(u-p_0-p_3))- \\ \frac{p_4}{\cosh^2(p_4(u-p_0-p_3))}p_2(u-p_0-p_3) \\ \frac{(u-p_0-p_3)}{\cosh^2(p_4(u-p_0-p_3))}p_2(u-p_0-p_3) \end{bmatrix},$$

where $T_{cl}=\hat{T}_{cl}$ and $u=\check{u}$.

For reference, the prediction error method is a known technology that is disclosed in "Theory and Practice of Recursive Identification" by Ljung and Soderstrom (MIT Press, 1983).

The reference clutch torque $\overline{T}_{cl}$ used in the parameter update step (S20) means the current transmission torque of the clutch, and may use a torque value that is actually transmitted from the clutch if possible.

However, since there is not a substantial sensor that directly measures the current torque transmitted from the clutch, a value, which may most accurately represent the current transmission torque of the clutch according to the driving condition of the vehicle if possible, is used as the reference clutch torque.

Accordingly, the torque of the engine connected to the clutch may be used as the reference clutch torque in a state in which the micro-slip of the clutch is stably maintained under 50 RPM.

This is because the overall power of the engine is transmitted through the clutch in the state in which the micro-slip of the clutch is stably maintained.

Of course, the driving condition, in which a motor torque is used as the reference clutch torque in the micro-slip state of the clutch, is present in a hybrid vehicle.

When the clutch is not in the micro-slip state, a torque value of a torque observer may be used for the vehicle.

Of course, the torque value calculated by the torque observer is an estimated value and may differ from a real clutch transmission torque. However, this may be one of methods of detecting a clutch transmission torque that is closest to the real torque when the clutch is not in the micro-slip state.

The characteristic inverse function used in the stroke calculation step is expressed by the following equation:

$$\tilde{u}(\tilde{T}_{cl}) = p_0 + \frac{1}{p_1}\tilde{T}_{cl} - \frac{p_2 \frac{\alpha*(\tilde{T}_{cl}-p_1p_3)+\beta}{(\tilde{T}_{cl}-p_1p_3)+\gamma}}{p_1\left(p_1+p_2\frac{\alpha*(\tilde{T}_{cl}-p_1p_3)+\beta}{(\tilde{T}_{cl}-p_1p_3)+\gamma}\right)}(\tilde{T}_{cl}-p_1p_3),$$

where $\tilde{u}$: a desired stroke,
$\tilde{T}_{cl}$: a desired clutch torque, $$\alpha(p_1, p_2) = \frac{1.446\frac{p_1}{p_2}+1.494}{\frac{p_1}{p_2}+1.304},$$

$$\beta(p_1, p_2, p_4) = \left(\frac{103.7\frac{p_2}{p_1}-154.8}{\frac{p_2}{p_1}+2765}\right)\left(\frac{p_1}{p_4}\right), \text{ and}$$

$$\gamma(p_1, p_2, p_4) = \left(\frac{2103\frac{p_2}{p_1}-4146}{\frac{p_2}{p_1}+5003}\right)\left(\frac{p_1}{p_4}\right).$$

For reference, $p_1p_3$ means a clutch transmission torque when the clutch actuator stroke is positioned at $p_3$.

Here, the desired clutch torque is a clutch transmission torque that should be realized in a next control cycle by the controller. The desired clutch torque is set by reflecting a variety of driving conditions of the vehicle, such as a pressing amount of an accelerator pedal by a driver, a shift status, and a shift stage, and the method of determining the desired clutch torque according to the driving conditions of the vehicle uses a conventional known technology.

As described above, the controller may more accurately control the clutch by reflecting the variation in the physical properties of the clutch varying in real time as variations in the parameters in the torque estimation step (S10) and the parameter update step (S20), by obtaining a clutch actuator stroke for accomplishing a desired clutch torque that should be controlled in a next control cycle according to the driving condition of the vehicle in the stroke calculation step (S30), and by performing the driving step (S40) based on the same. Ultimately, it is possible to improve shift quality and driving quality of the vehicle and thus enhance merchantable quality of the vehicle.

The controller 5 repeatedly performs the above process while the vehicle continues to travel, and the sensed stroke of the clutch actuator that is driven in the driving step (S40) is finally used in the torque estimation step (S10) of a next control cycle.

Figure 5:
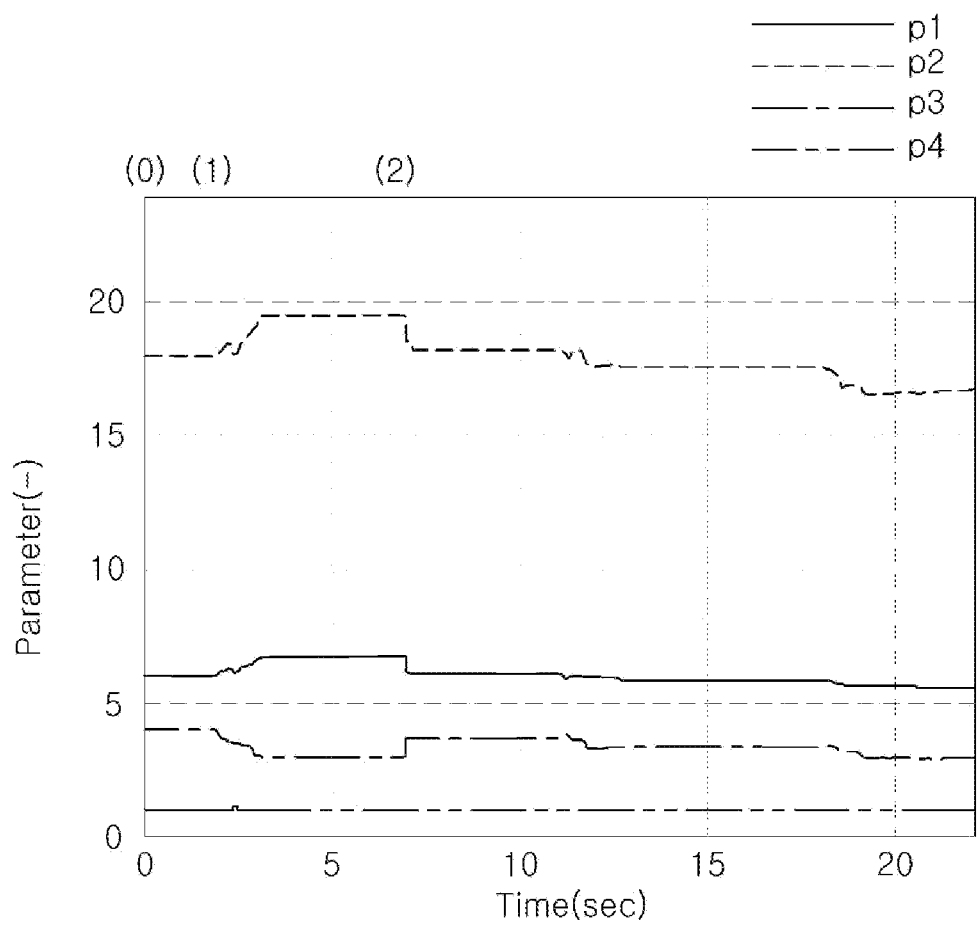
FIG. 5 is a graph illustrating variations in parameters over time in one form of the present disclosure.
Figure 6:
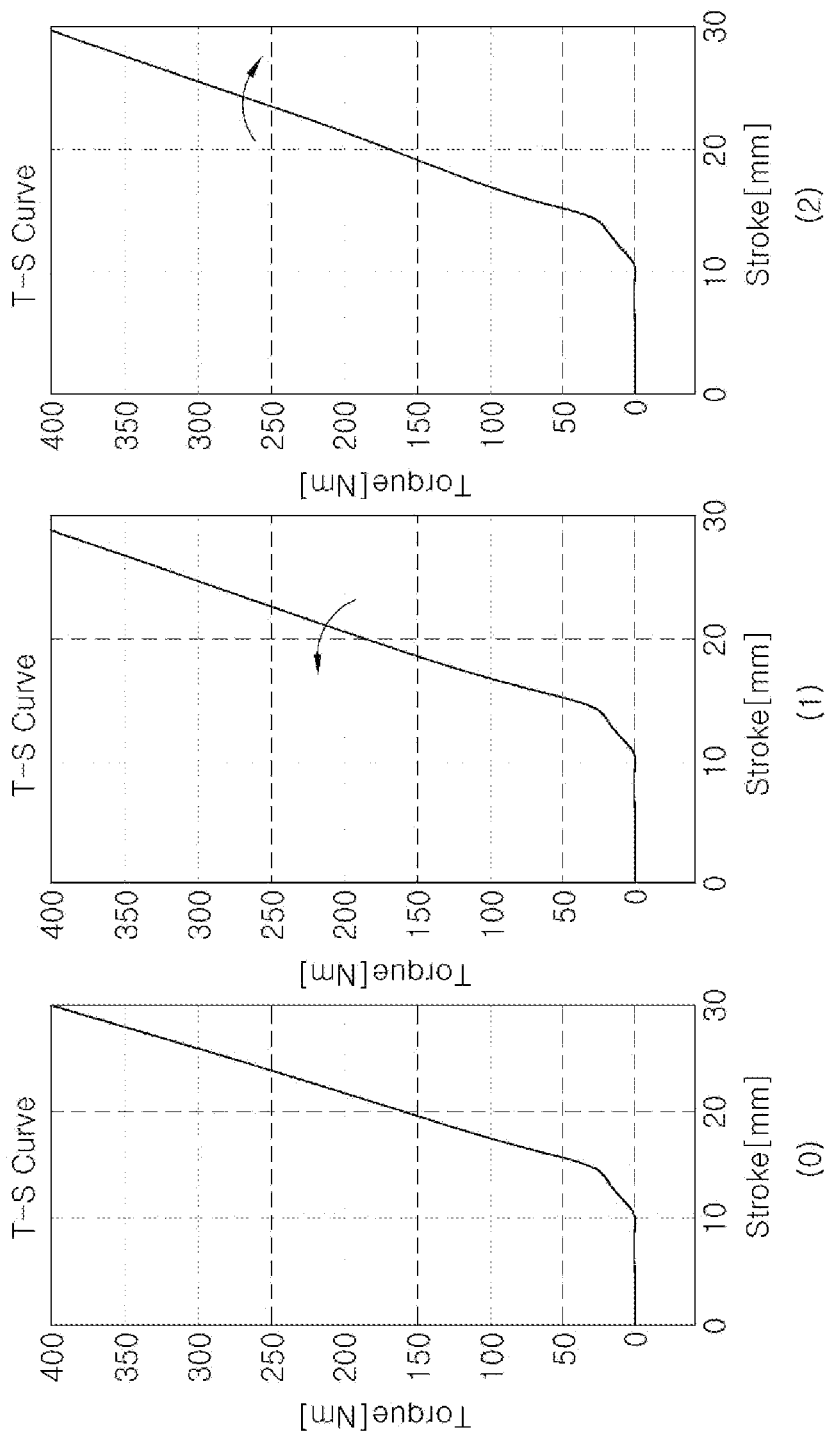
FIG. 6 is a graph for explaining that the T-S curve is updated by the variations in parameters of FIG. 5.

For reference, FIG. 5 illustrates that parameters vary depending on the state of the clutch that is gradually changed from an initial state, and FIG. 6 illustrates that the T-S curve is adapted according to the variations in parameters. In FIGS. 5 and 6, reference numeral (0) refers to an initial state, and reference numerals (1) and (2) refer to states that are sequentially changed after the initial state.

The state (1) is a state in which the parameters are updated in the parameter update step when the estimated clutch torque is calculated using the parameters in the state (0) and the torque error calculated using the estimated clutch torque is a positive value. In the state (1), the parameters are updated such that an error in a corresponding stroke is reduced in such a way to increase $p_1$ and $p_2$ and decrease $p_3$, compared to the state (0). As illustrated in the state (1) of FIG. 6, the T-S curve is in a state in which it is slightly rotated counterclockwise by the variation in parameters, compared to the state (0).

The state (2) is a state in which the parameters are updated in the parameter update step when the estimated clutch torque is calculated using the parameters in the state (1) and the torque error calculated using the estimated clutch torque is a negative value. In the state (2), the parameters are updated such that an error in a corresponding stroke is reduced in such a way to decrease $p_1$ and $p_2$ and increase $p_3$, compared to the state (1). As illustrated in the state (2) of FIG. 6, the T-S curve is in a state in which it is slightly rotated clockwise by the variation in parameters, compared to the state (1).

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A clutch control method for a vehicle, comprising steps of:
    calculating an estimated clutch torque by substituting a plurality of parameters, which represent physical properties of a clutch, and a sensed stroke of a clutch actuator into a predetermined characteristic function, which represents characteristics of a clutch transmission torque to a clutch actuator stroke, by a controller;
    updating the plurality of parameters as new values by a prediction error method based on a torque error, which is a difference between a reference clutch torque referring to a current transmission torque of the clutch and the estimated clutch torque calculated in the step of calculating the estimated clutch torque, by the controller;
    calculating a desired stroke by substituting a desired clutch torque and the updated parameters into a predetermined characteristic inverse function, which represents a clutch actuator stroke to a clutch transmission torque, by the controller; and
    driving the clutch actuator based on the calculated desired stroke to control the clutch by the controller.

2. The clutch control method according to claim 1, wherein the plurality of parameters comprise a touch point, a cushion spring constant, a diaphragm spring constant, a clutch actuator stroke at which a diaphragm spring begins to be deformed, and a rate of change of a value, which is obtained by adding the cushion spring constant and the diaphragm spring constant, based on a change of the clutch actuator stroke.

3. The clutch control method according to claim 2, wherein the characteristic function is calculated as:

$$\hat{T}_{cl}(\breve{u}) = 1/2\{\tan h(10(\breve{u}-p_0)) + |\tan h(10(\breve{u}-p_0))|\}p_1(\breve{u}-p_0) + 1/2\{\tan h(p_4(\breve{u}-p_0-p_3)) + |\tan h(p_4(\breve{u}-p_0-p_3))|\}p_2(\breve{u}-p_0-p_3),$$

where:
$\hat{T}_{cl}$ is an estimated clutch torque,
$\breve{u}$ is sensed clutch actuator stroke,
$p_0$ is a clutch touch point,
$p_1$ is a cushion spring constant,
$p_2$ is a diaphragm spring constant,
$p_3$ is a clutch actuator stroke at which a diaphragm spring begins to be deformed, and
$p_4$ is a rate of change of a value, which is obtained by adding the cushion spring constant and the diaphragm spring constant, based on a change of the clutch actuator stroke.

4. The clutch control method according to claim 3, wherein the characteristic inverse function is calculated as:

$$\tilde{u}(\tilde{T}_{cl}) = p_0 + \frac{1}{p_1}\tilde{T}_{cl} - \frac{p_2 \frac{\alpha*(\tilde{T}_{cl} - p_1 p_3) + \beta}{(\tilde{T}_{cl} - p_1 p_3) + \gamma}}{p_1\left(p_1 + p_2\frac{\alpha*(\tilde{T}_{cl} - p_1 p_3) + \beta}{(\tilde{T}_{cl} - p_1 p_3) + \gamma}\right)}(\tilde{T}_{cl} - p_1 p_3),$$

where:
$\tilde{u}$ is a desired stroke,
$\tilde{T}_{cl}$ is a desired clutch torque, $$\alpha(p_1, p_2) = \frac{1.446\frac{p_1}{p_2} + 1.494}{\frac{p_1}{p_2} + 1.304},$$

$$\beta(p_1, p_2, p_4) = \left(\frac{103.7\frac{p_2}{p_1} - 154.8}{\frac{p_2}{p_1} + 2765}\right)\left(\frac{p_1}{p_4}\right), \text{ and}$$

$$\gamma(p_1, p_2, p_4) = \left(\frac{2103\frac{p_2}{p_1} - 4146}{\frac{p_2}{p_1} + 5003}\right)\left(\frac{p_1}{p_4}\right).$$

5. The clutch control method according to claim 4, wherein the updating the parameters is performed as:

$p_n(k) = p_n(k-1) + q(k)e(k)$ where:
n is 1, 2, 3, and 4,
k is a current control cycle,
k−1 is a previous control cycle,
$e(k) = \overline{T}_{cl}(k) - \hat{T}_{cl}(k)$,
$\overline{T}_{cl}(k)$ is a reference clutch torque,
$q(k) = p_n(k-1)\psi(k)/s(k)$,
$s(k) = \psi^T(k)p_n(k-1)\psi(k) - \lambda(k)$
$\lambda(k)$ is a forgetting factor ($0 < \lambda(k) < 1$), and $$\psi = \begin{bmatrix} \frac{\partial T_{cl}}{\partial p_1} \\ \frac{\partial T_{cl}}{\partial p_2} \\ \frac{\partial T_{cl}}{\partial p_3} \\ \frac{\partial T_{cl}}{\partial p_4} \end{bmatrix} = \begin{bmatrix} \frac{1}{2}\{\tanh(10(u - p_0)) + |\tanh(10(u - p_0))|\}(u - p_0) \\ \frac{1}{2}\{\tanh(p_4(u - p_0 - p_3)) + |\tanh(p_4(u - p_0 - p_3))|\}(u - p_0 - p_3) \\ -p_2\tanh(p_4(u - p_0 - p_3)) - \\ \frac{p_4}{\cosh^2(p_4(u - p_0 - p_3))}p_2(u - p_0 - p_3) \\ \frac{(u - p_0 - p_3)}{\cosh^2(p_4(u - p_0 - p_3))}p_2(u - p_0 - p_3) \end{bmatrix},$$

where: $T_{cl} = \hat{T}_{cl}$ and $u = \breve{u}$.

6. The clutch control method according to claim 1, wherein the reference clutch torque is a torque value of a torque observer.

7. The clutch control method according to claim 1, wherein in a state where a micro-slip of the clutch is maintained under approximately 50 RPM, a torque of an engine connected to the clutch is used as the reference clutch torque.

* * * * *